United States Patent

Siddall

[15] 3,679,720

[45] July 25, 1972

[54] ACYL FLUORIDES

[72] Inventor: John B. Siddall, Palo Alto, Calif.

[73] Assignee: Zoecon Corporation, Palo Alto, Calif.

[22] Filed: Feb. 26, 1970

[21] Appl. No.: 14,660

Related U.S. Application Data

[63] Continuation-in-part of Ser. No. 854,778, Sept. 2, 1969, Pat. No. 3,649,590.

[52] U.S. Cl.................................260/408, 424/318, 260/413
[51] Int. Cl.............................................................C11c 3/00
[58] Field of Search....................................260/408

[56] References Cited

OTHER PUBLICATIONS

Thomas et al. Chem. Abst. Vol. 69 (1968) 85702c
Nazaroj et al. Chem. Abst. Vol. 55 (1961) 351b
Canonica et al. Chem. Abst. Vol. 52 (1958) 1173b

*Primary Examiner*—Lewis Gotts
*Assistant Examiner*—Catherine L. Mills
*Attorney*—Donald W. Erickson

[57] ABSTRACT

Novel quaternary alkylated acyl fluorides prepared from acyl chloride or bromide by reaction with anhydrous fluoride useful as insect control agents.

20 Claims, No Drawings

ACYL FLUORIDES

This is a continuation-in-part of application Ser. No. 854,778, filed Sept. 2, 1969 now U.S. Pat. No. 3,649,590.

This invention relates to methods and compositions for the control of insects and to novel quaternary alkylated acyl fluorides of the following formula A:

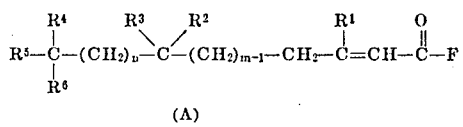

(A)

wherein,
m is an integer of 1 to 6;
n is an integer of 2 to 6;
$R^2$ is hydrogen or alkyl;
each of $R^1$, $R^3$, $R^4$, $R^5$ and $R^6$ is alkyl.

The term "alkyl", as used herein, refers to a straight or branched chain saturated aliphatic hydrocarbon group having a chain length of one to 12 carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. When "alkyl" is modified by the term "lower" herein, the chain length of the alkyl group is one to six carbon atoms.

The present invention provides a novel method for the control of insects which comprises treating the insects with an effective amount of a compound of formula A. To aid in achieving uniform and economical application, it is advantageous to employ a composition comprising an inert carrier and a compound of formula A. These compositions can be either liquid or solid. The exact formulation employed will vary according to factors, such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary role or mechanism of treating the insects — that is, topical application (absorption), per oral application (ingestion), chemosterilant (sterility) or vaporization (inhalation). The primary mode of treating insects is, in turn, dependent on whether the insect is a chewing insect, a sucking insect or flying insect; whether the control of the insect is sought at the embryo, larvae, pupae or adult stage; and the locus of the insect.

Formulations can be prepared by incorporating a compound of formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such as emulsifying agents, wetting agents and dispersing agents. Generally, the formulation will contain less than 95 percent by weight of the compound and more frequently less than 25 percent. Depending upon the particular insect being treated and the particular stage of the life cycle at the time of treatment, control of insects by treating the insects with a compound of formula A is accomplished by the compound's ability to: inhibit metamorphosis; act as a direct insecticide, particularly at the embryo stage; act as a chemosterilant; or break the diapause of the insect.

Treatment of insects by vapor action can be accomplished, for example, by formulating a compound of formula A with a resinous material, such as the vinyl polymers, e.g. polyvinyl chloride. This method is particularly useful for flying insects and treating enclosed areas. Suitable formulating method and carriers are described in U.S. Pat. No. 3,318,769, for example.

Vapor effect and control through fumigation can also be done by spraying a solution which optionally contains a film-forming agent, such as wax, polyvinyl alcohol, or the like, onto structures.

Although not intending to be limited by a theoretical explanation, it appears that the effectiveness of the compounds of formula A can be traced to their ability to mimic the activity of juvenile hormone substances. Juvenile hormone was identified as methyl 10,11-oxido-7-ethyl-3,11-trimethyltrideca-2,6-dienoate using an extract of Cecropia moths by Roeller et al., Angew. Chem. internat. Edit. 6, 179 (1967) and Chemical & Engineering New, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth", Zoology (Proc. N.A.S.) 60, 853 (1968). In addition to the natural juvenile hormones, some synthetic terpenoids have been reported exhibiting maturation inhibiting, sterility or ovicidal activity. U.S. Pat. Nos. 3,429,970 and 3,453,362.

In the application of the compounds of formula A, it is more economical and expedient to use a mixture of isomers to avoid separation processing. As individual isomers, the trans isomer is preferably employed for the control of insects.

Typical insects which can be controlled by treatment with a compound of formula A in accordance with the present invention are *Dysdercus cingluatus*, *Tenebrio molitor*, *Galleria mellonella*, *Tribolium confusum*, *Periplaneta Americana*, *Hypera puctata* (clover leaf weevil), *Dysdercus suturellus*, Aphididae, such as melon aphid and cabbage aphid, *Tinea pellionella*, *Sitophilus granarius*, *Lygus hesperus*, *Schistocerca vaga* and *Pyrrhocoris apterus*.

In the description hereinafter, each of $R^1$, $R^2$, $R^3$, $R^4$, $R^5$, $R^6$, m and n is as defined hereinabove.

The compounds of formula A are prepared according to the following transformation:

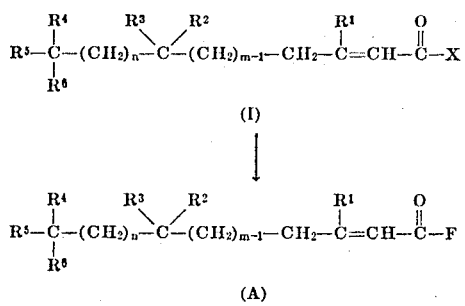

In the practice of the above process, an acyl chloride or bromide of formula I is reacted with anhydrous hydrogen fluoride at a temperature of from about room temperature to −10° C., although higher or lower temperatures can be used. Generally, a temperature of from about 20° C. to about −5° C. is used. The reaction is generally complete in from a few minutes to a few hours, such as about 30 minutes to 2 hours. The reaction is carried out under dry conditions and optionally in the presence of a solvent inert to the reaction, such as ether, tetrahydrofuran, benzene, toluene, hexane, pentane, and the like.

The acyl chloride and bromide of formula I are prepared from the corresponding acid of formula II:

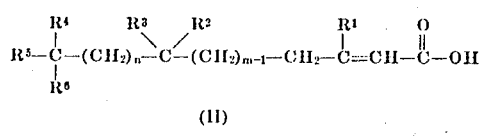

(II)

by treatment with thionyl chloride, phosphorus pentachloride or trichloride, phosphorus tribromide, or phosphorus pentabromide.

The acids of formula II, and the synthesis thereof, are described in my application, Ser. No. 854,778, filed Sept. 2, 1969, the disclosure of which is incorporated by reference.

The following examples set forth detailed procedures for the preparation of the compounds of the present invention and serve to illustrate the synthesis thereof and the invention. Temperature in degrees centigrade.

EXAMPLE 1

A. One gram of thionyl chloride is added with stirring at room temperature to 0.5 g. of 3,7,7,11,11-pentamethyldodec-2-enoic acid in benzene and stirred at about room temperature for about 2 hours. Excess thionyl chloride is removed by evaporation and the solvent evaporated under reduced pressure to yield the acid chloride (3,7,11,11-pentamethyldodec-2-enyl chloride).

The acyl bromide is prepared using phosphorus pentabromide and temperature of about 35° for 2 hours.

Using the above procedure, there is prepared:
3,7,7,11,11-pentamethyltridec-2-enoyl chloride,
3,7,11,11-tetramethyl-7-ethyltridec-2-enoyl chloride,
3,7,11,11-tetramethyldodec-2-enoyl chloride,
3,7,11,11-tetramethyltridec-2-enoyl chloride, and
3,11,11-trimethyl-7-ethyltridec-2-enoyl chloride from
3,7,7,11,11-pentamethyltridec-2-enoic acid,
3,7,11,11-tetramethyl-7-ethyltridec-2-enoic acid,
3,7,11,11-tetramethyldodec-2-enoic acid,
3,7,11,11-tetramethyltridec-2-enoic acid, and
3,11,11-trimethyl-7-ethyltridec-2-enoic acid, respectively.

B. The process of Part A is repeated with the exception of using an equivalent amount of each of the acids listed in Column I to yield the corresponding acid chloride.

Column I 3-ethyl-7,7,11,11-tetramethyldodec-2-enoic acid,
7-ethyl-3,7,10,10-tetramethylundec-2-enoic acid,
3,6,6,10,10-pentamethylundec-2-enoic acid,
3,5,5,9,9-pentamethyldec-2-enoic acid,
3,7,7,10,10-pentamethylundec-2-enoic acid,
3-ethyl-7,7,10,10-tetramethylundec-2-enoic acid,
3,7,7,11-tetramethyl-11Ethyltridec-2-enoic acid,
3,7,7-trimethyl-11,11-diethyltridec-2-enoic acid,
3,7,7-trimethyl-11,11,-diethyltetradec-2-enoic acid,
3,7,7,11-tetramethyl-11(n-propyl)tetradec-2-enoic acid,
3,7,7,11,11-pentamethylpentadec-2-enoic acid,
3-ethyl-7,7,11,11-tetramethyltridec-2-enoic acid,
3,7,10,10-tetramethyl-7-ethyldodec-2-enoic acid,
3,7,10-trimethyl-7,10-diethyldodec-2-enoic acid,
3,7,7,10,10-pentamethyldodec-2-enoic acid,
3,7,7,10-tetramethyl-10-ethyldodec-2-enoic acid,
3,7,7,12,12-pentamethyltridec-2-enoic acid,
3,8,8,13,13-pentamethyltetradec-2-enoic acid,
3,7,10,10-tetramethylundec-2-enoic acid,
3,7,10,10-tetramethyldodec-2-enoic acid,
3,10,10-trimethyl-7-ethyldodec-2-enoic acid,
3-ethyl-7,11,11-trimethyltridec-2-enoic acid,
3,7-diethyl-10,10-dimethyldodec-2-enoic acid, and
3-ethyl-7,10,10-trimethyldodec-2-enoic acid.

EXAMPLE 2

Into 10 g. of 3,7,7,11,11-pentamethyldodec-2-enoyl chloride, at −5° to 0°, a continuous stream of anhydrous gaseous hydrogen fluoride is introduced slowly for about 1 hour. The reaction is then allowed to warm to room temperature and stand for 2 hours. Excess hydrogen fluoride is removed by addition of dry sodium fluoride and then the mixture filtered. The filtrate is purified by chromatography or distillation to yield 3,7,7,11,11-pentamethyldodec-2-enoyl fluoride.

The above reaction can also be carried out by adding the required amount (1 molar equivalent or slight excess) of anhydrous liquid hydrogen fluoride to 3,7,7,11,11-pentamethyldodec-2-enoyl chloride at −5° to 0° with stirring.

Using the process of this example, each of the acyl chlorides of Example 1 (Part A) is converted into the corresponding acyl fluoride, that is:
3,7,7,11,11-pentamethyltridec-2-enoyl fluoride,
3,7,11,11-tetramethyl-7-ethyltridec-2-enoyl fluoride,
3,7,11,11-tetramethyldodec-2-enoyl fluoride,
3,7,11,11-tetramethyltridec-2-enoyl fluoride, and
3,11,11-trimethyl-7-ethyltridec-2-enoyl fluoride.

By repeating the process of this example using the acid chloride of each of the acids listed in Column I, the corresponding acid fluorides are obtained.

EXAMPLE 3

Compositions suitable for the control of insects in accordance with the present invention are exemplified by the following. Parts by weight.

|  | Parts |
|---|---|
| 3,7,7,11,11-pentamethyldodec-2-enoyl fluoride | 15 |
| Xylene | 85 |
| 3,7,7,11,11-pentamethyltridec-2-enoyl fluoride | 10 |
| Polyvinyl chloride granules | 90 |
| 3,7,11,11-tetramethyldodec-2-enoyl fluoride | 5 |
| Xylene | 40 |
| Kerosene | 55 |

In the use of the above compositions for the control of flying insects or other pests in enclosed areas, there is employed from about 0.3 to 1.2 pounds of active component per 1,000 cubic feet of enclosed space for fumigation.

What is claimed is:

1. A compound selected from those of formula A:

$$R^5-\underset{\underset{R^6}{|}}{C}-(CH_2)_n-\underset{R^3}{\overset{R^2}{C}}-(CH_2)_{m-1}-CH_2-\underset{R^1}{C}=CH-\overset{O}{\overset{\|}{C}}-F$$

(A)

wherein,
m is an integer of 1 to 6;
n is an integer of 2 to 6;
$R^2$ is hydrogen or alkyl containing from one to six carbon atoms; and
each of $R^1$, $R^3$, $R^4$, $R^5$ and $R^6$ is alkyl containing from one to six carbon atoms.

2. A compound according to claim 1 wherein m is an integer of 1 to 4; n is an integer of 2 to 4; and each of $R^1$, $R^2$, $R^3$, $R^4$, $R^5$ and $R^6$ is alkyl containing from one to six carbon atoms.

3. A compound according to claim 1 wherein m is an integer of 1 to 4; n is an integer of 2 to 4; each of $R^1$, $R^3$, $R^4$, $R^5$ and $R^6$ is alkyl containing from one to six carbon atoms; and $R^2$ is hydrogen.

4. A compound according to claim 2 wherein each of $R^1$, $R^2$, $R^3$, $R^4$, $R^5$ and $R^6$ is methyl or ethyl.

5. A compound according to claim 2 wherein each of $R^1$, $R^2$, $R^3$, $R^4$ and $R^6$ is methyl and $R^5$ is methyl or ethyl.

6. A compound according to claim 5 wherein m is 3 and n is 2 or 3.

7. A compound according to claim 5 wherein each of $R^1$, $R^2$, $R^4$ and $R^6$ is methyl and each of $R^3$ and $R^5$ is ethyl.

8. A compound according to claim 7 wherein m is 3 and n is 2 or 3.

9. A compound according to claim 3 wherein each of $R^1$, $R^3$, $R^4$, $R^5$ and $R^6$ is methyl or ethyl.

10. A compound according to claim 3 wherein each of $R^1$, $R^3$, $R^4$ and $R^6$ is methyl and $R^5$ is methyl or ethyl.

11. A compound according to claim 10 wherein m is 3 and n is 2 or 3.

12. A compound according to claim 3 wherein each of $R^1$, $R^4$ and $R^6$ is methyl and each of $R^3$ and $R^5$ is ethyl.

13. A compound according to claim 12 wherein m is 3 and n is 2 or 3.

14. A compound selected from those of the following formula:

$$R^5-\underset{\underset{R^6}{|}}{C}-(CH_2)_n-\underset{R^3}{\overset{R^2}{C}}-(CH_2)_{m-1}-CH_2-\underset{R^1}{C}=CH-\overset{O}{\overset{\|}{C}}-X$$

wherein,
X is chloro or bromo;
$m$ is an integer of 1 to 6;
$n$ is an integer of 1 to 6;
$R^2$ is hydrogen or alkyl containing from one to six carbon atoms; and
each of $R^1$, $R^3$, $R^4$, $R^5$ and $R^6$ is alkyl containing from one to six carbon atoms.

15. A compound according to claim 14 wherein each of $R^1$, $R^3$, $R^4$, $R^5$ and $R^6$ is methyl or ethyl and $R^2$ is hydrogen, methyl or ethyl.

16. A compound according to claim 15 wherein $m$ is 3; $n$ is 2 or 3; each of $R^1$, $R^3$, $R^4$ and $R^6$ is methyl; $R^5$ is methyl or ethyl; and $R^2$ is hydrogen or methyl.

17. A compound according to claim 15 wherein $m$ is 3; $n$ is 2 or 3; each of $R^1$, $R^2$ and $R^4$ is methyl; each of $R^3$ and $R^5$ is ethyl; and $R^2$ is hydrogen or methyl.

18. A compound according to claim 16 wherein X is chloro.

19. A compound according to claim 17 wherein X is chloro.

20. A compound according to claim 11 wherein $n$ is 3.

* * * * *